United States Patent [19]

Fraignier et al.

[11] Patent Number: 4,550,617
[45] Date of Patent: Nov. 5, 1985

[54] MULTI AXIS FORCE AND MOMENTS TRANSDUCER

[75] Inventors: Bernard Fraignier, Villemonble; Daniel E. Géry, Saint Remy, both of France

[73] Assignee: Societe Nationale d'Etude et de Construction de Moteurs d'Aviation "S.N.E.C.M.A.", France

[21] Appl. No.: 607,262

[22] Filed: May 4, 1984

[30] Foreign Application Priority Data

May 6, 1983 [FR] France ................ 83 07957

[51] Int. Cl.$^4$ .............................................. G01L 5/16
[52] U.S. Cl. ................................................. 73/862.04
[58] Field of Search ........... 73/862.04, 862.05, 862.06

[56] References Cited

U.S. PATENT DOCUMENTS

| 3,427,875 | 2/1969 | Saxl ................... | 73/862.04 |
| 3,740,494 | 6/1973 | Dunand et al. ........ | 73/862.04 X |
| 3,948,093 | 4/1976 | Folchi et al. ........ | 73/862.04 |
| 4,138,884 | 2/1979 | Ruoff, Jr. et al. . | |

FOREIGN PATENT DOCUMENTS

| 0023864 | 2/1981 | European Pat. Off. . | |
| 2124790 | 9/1972 | France . | |
| 2096777 | 10/1982 | United Kingdom . | |
| 0146551 | 5/1962 | U.S.S.R. ............ | 73/862.04 |

OTHER PUBLICATIONS

Le Nouvel Automatisme–Nov. 1978 (pp. 317–327, Figure 2).

Primary Examiner—Charles A. Ruehl
Attorney, Agent, or Firm—Bacon & Thomas

[57] ABSTRACT

A multi-axis force and moment transducer having a plurality of flexible plates, orthogonally oriented, interconnected between first and second bodies to measure the forces exerted thereon due to relative movement between the bodies. The interconnection between a first element attached to the first body and a second element attached to the second body is affected by a plurality of first thin flexible plates and a plurality of second thin flexible plates, the ends of the plates being interconnected by a ball-joint coupling. The first thin flexible plates are oriented such that they flex in a direction generally perpendicular to a first axis, while the second thin flexible plates are oriented such that they flex in a direction generally parallel to such axis. Strain gauges may be provided on each of the thin flexible plates to provide an output of the forces.

21 Claims, 10 Drawing Figures

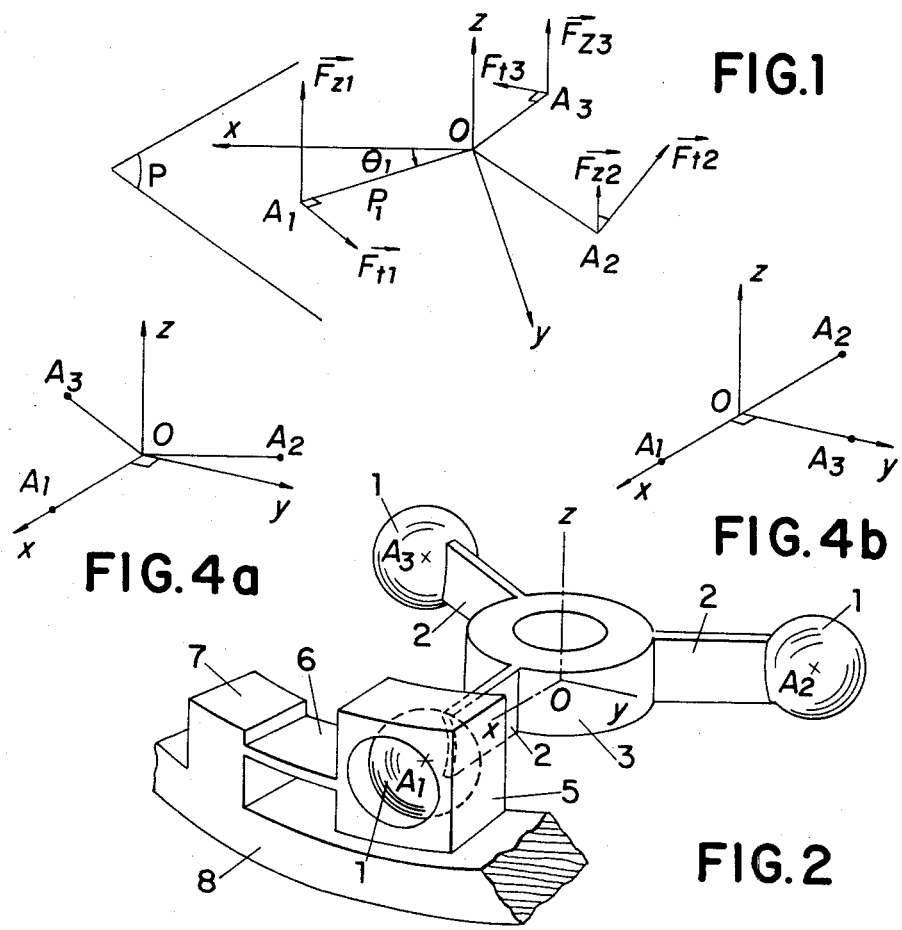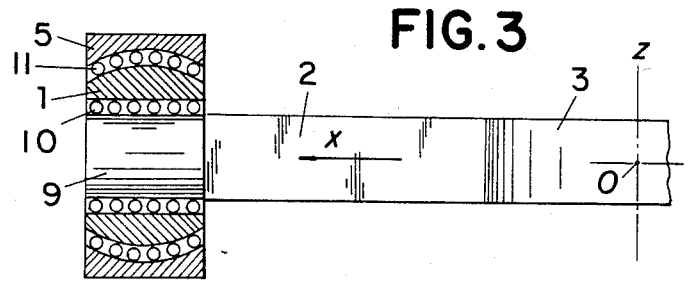

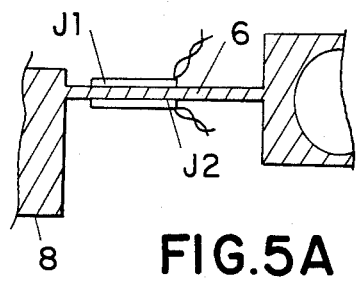
FIG.5A
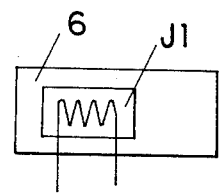
FIG.5B
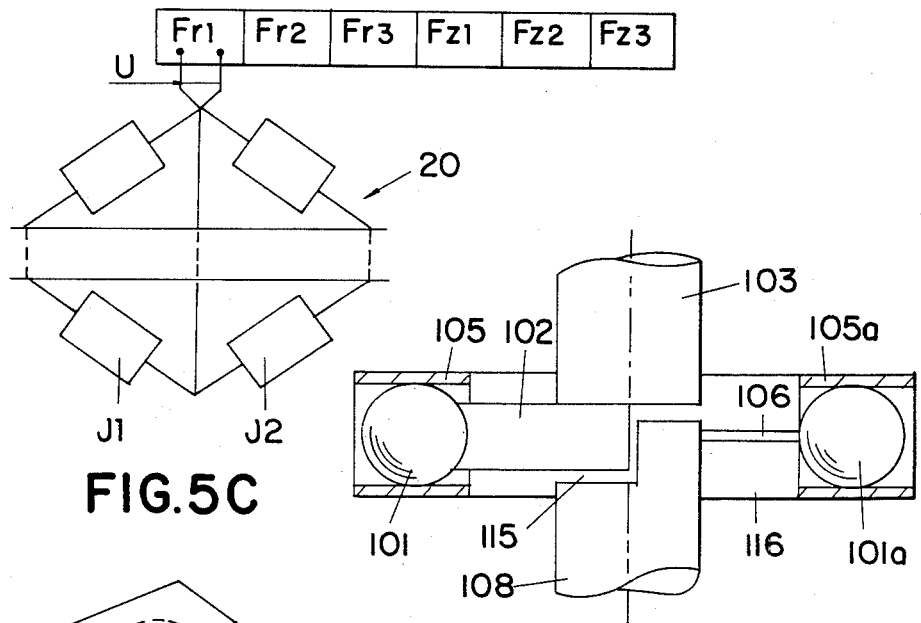
FIG.5C
FIG.6
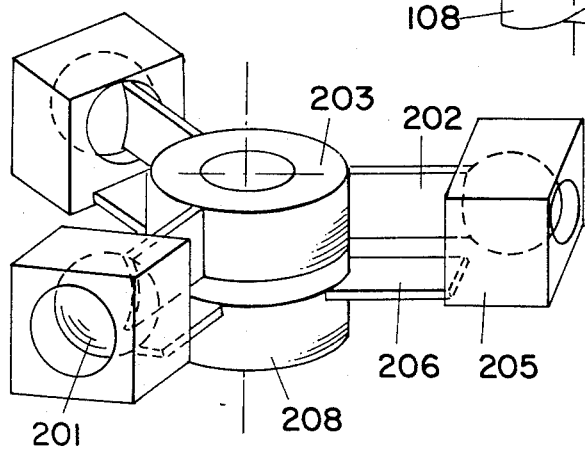
FIG.7

MULTI AXIS FORCE AND MOMENTS TRANSDUCER

BACKGROUND OF THE INVENTION

The instant invention relates to a multi axis force and moments transducer to determine the forces and moments between first and second bodies. French Pat. 2,281,560 discloses a transducer of this type wherein a hub, attached to the first body, is connected to a ring casing, attached to the second body, via four arms. The positioning of these arms between the hub and the ring casing enables the tangential lateral displacement of the four points connected with the hub and the longitudinal displacements of further points connected to the hub by a flange having indications which permit the determination of the six components of the resultant forces and moments of the force supplied between the bodies. While this device yields the desired results, it is relatively complex.

SUMMARY OF THE INVENTION

The instant invention relates to a transducer of simplified configuration which ensures accurate measurements of forces existing between two bodies without extraneous interferences, so as to permit the accurate determination of the resultant forces acting on the bodies. This is achieved by a joining means between the two bodies comprising first and second elements connected to the first and second bodies, respectively, interconnected by a series of relatively thin flexible plates. A plurality of first flexible plates are attached at one end to the first element and oriented such that they flex only in a direction generally perpendicular to a first, central axis of the first element. A second plurality of relatively thin flexible plates are attached at one end to the second element, the second plates being oriented generally perpendicularly to the first flexible plates such that they flex only in a direction generally parallel to the first, central axis. The second ends of the first and second thin flexible plates are attached to a series of housing means, which may include anti-friction bearing elements to eliminate the effects of frictional forces. The connection between the first and second flexible plates and the housing means transmit only stresses having components in the principal or orthogonal direction of the associated plates. Strain gauges or other measurement means are associated with each of the first and second flexible plates to accurately determine the forces and moments between the two bodies.

The housing means may comprise a sleeve element which defines a socket opening with the second ends of the plurality of first flexible plates having a ball attached thereto which fits within the socket opening. Anti-friction means, such as ball bearings, may be interposed between the connection of the ball and the first flexible plates and also between the ball and the socket opening to minimize the effects of frictional forces on the transducer.

The plurality of second flexible plates may be contained within planes which are parallel to each other, or may be contained within the same plane, which extends generally perpendicular to the first, central axis. The lengths of the second flexible plates may also be equal to each other.

The plurality of first flexible plates may also be of equal length and may be displaced equidistantly from each other about the first, central axis. It is also within the scope of the invention to orient two of the first flexible plates such that they are disposed at an angle of 180° between them, and to dispose the third flexible plate at an angle of 90° thereto.

BRIEF DESCRIPTION OF THE DRAWINGS

FIG. 1 is a schematic diagram showing the forces to be measured by a transducer according to the invention so as to permit an easy determination of the resultant forces;

FIG. 2 is a partial perspective view showing the transducer apparatus according to a first embodiment of the invention;

FIG. 3 is a partial, sectional view showing an embodiment of the joint between the first flexible plate and the housing means;

FIG. 4a is a perspective, schematic diagram showing the orientation of the first flexible plates in relation to the orthogonal force axes according to a first embodiment of the invention;

FIG. 4b is a perspective, schematic diagram showing the orientation of the first flexible plates in relation to the force axes according to a second embodiment of the invention;

FIGS. 5a, 5b and 5c are schematic illustrations of the attachment of strain gauges to the flexible plates according to the invention;

FIG. 6 is a partial sectional view showing the orientation of the first and second flexible plates according to a third embodiment of the invention; and, FIG. 7 is a partial, perspective view showing the orientation of the first and second flexible plates according to a fourth embodiment of the invention.

DETAILED DESCRIPTION OF THE PREFERRED EMBODIMENTS

The invention provides means to determine the resultant force acting between two bodies or between two portions of the same body by a single measurement. The two areas between which the forces are to be measured are interconnected by first and second elements, respectively, which are, in turn, connected by a series of relatively thin flexible plates oriented such that they flex in perpendicular directions. The invention permits the direct measurement of each stress force on the two orthogonal components of the flexible plates, the third force being zero by design. FIG. 1 shows a schematic diagram according to which the measured components of the stress forces are arranged to permit a relatively simple calculation of the parameters of the resultant force. The positions $A_1$, $A_2$ and $A_3$ designate the housing means connecting the ends of the first and second pluraltity of thin flexible plates and P the plane in which they are contained. The force coordinates, xyz, the chosen that the origin O, and the x and y axes coincide with plane P. The connections A are designed so that the stress forces are contained exclusively in the planes passing therethrough and oriented perpendicularly to $OA_i$. Each of these forces can be defined by a normal component $Fz_i$ extending parallel to the Z axis, and a tangential component $Ft_i$ located in plane P. If $\rho_i$, $\theta_i$ are the polar coordinates of $A_i$ in plane P, the six parameters of the components of the equivalent resultant force in the reference Oxyz, i.e., the components according to Ox, Oy and Oz of the equivalent vector force may be calculated:

(1): $-(\vec{Ft_1}\sin\theta_1 + \vec{Ft_2}\sin\theta_2 + \vec{Ft_3}\sin\theta_3)$ (2): $\vec{Ft_1}\cos\theta_1 + \vec{Ft_2}\cos\theta_2 + \vec{Ft_3}\cos\theta_3$ (3): $\vec{Fz_1} + \vec{Fz_2} + \vec{Fz_3}$ and the equivalent vector couple (4): $\vec{Fz_1}\rho_1\sin\theta_1 + \vec{Fz_2}\rho_2\sin\theta_2 + \vec{Fz_3}\rho_3\sin\theta_3$ (5): $-(\vec{Fz_1}\rho_1\cos\theta_1 + \vec{Fz_2}\rho_2\cos\theta_2 + \vec{Fz_3}\rho_3\cos\theta_3)$ (6): $\vec{Ft_1}\rho_1 + \vec{Ft_2}\rho_2 + \vec{Ft_3}\rho_3$ From these data, it is obviously possible to calculate the components of the equivalent resultant in any other frame of reference.

If, for the sake of further simplification in a first embodiment:

$\rho_1=\rho_2=\rho_3=\rho$; $\theta_1=0$; $\theta_2=120°$ and $\theta_3=240°$, the respective parameters of the components of the equivalent resultant become;

(1'): $(\sqrt{3}/2)(\vec{Ft_3} + \vec{Ft_2})$ (2'): $\vec{Ft_1} - (1/2)(\vec{Ft_2} + \vec{Ft_3})$ (3'): $\vec{Fz_1} + \vec{Fz_2} + \vec{Fz_3}$ (4'): $\rho(\sqrt{3}/2)(\vec{Fz_2} - \vec{Fz_3})$ (5'): $\rho(1/2)\vec{Fz_2} + (1/2)(\vec{Fz_3} - \vec{Fz_1})$ (6'): $\rho(\vec{Ft_1} + \vec{Ft_2} + \vec{Ft_3})$ This simplified concept is preferred for the embodiment shown in FIG. 2.

As shown in that figure, $A_1$, $A_2$ and $A_3$ are the center of the ball couplings 1 which are secured to one end of the thin flexible plates 2 which extend radially from hub 3 which is rigidly connected to one of the bodies to be studied. In this embodiment, the housing means 5 each define a socket opening into which the ball coupling 1 extends. The housing means 5 is also connected to one end of each of the second flexible plates 6 which has its other end attached to fastener 7 of second element 8. In this particular embodiment, the second element is in the form of a ring which extends about the first element or hub 3 and which is attached to the second body. Although only one such second flexible plate is shown, it is understood that a plurality of such plates are located about the ring element 8 and that their number may be equal to the number of first thin flexible plates 2.

The first plurality of flexible plates 2 which extend radially from first element or hub 3 are oriented such that their major width dimension extends parallel to the axis Oz such that they will flex in a direction generally perpendicular to this first axis. The orientation of the second plurality of flexible plates 6 is such that their major width dimension extends generally perpendicular to the axis Oz such that they will flex in a direction generally parallel to this axis. Each of the lengths of the flexible plates 2 may be equivalent to each other, while the lengths of the second flexible plates 6 may also be equivalent to each other. The flexible plates 6 may be contained in planes which are parallel to each other and, may, be contained within a single plane extending generally perpendicular to the axis Oz.

In order to minimize the influence of extraneous frictional forces, anti-friction means may be incorporated in the joint between the ball coupling 1 and the housing means 5. As shown in FIG. 3, a second end of flexible plate 2 is formed in the shape of a cylinder 9 which extends through ball coupling 1. Anti-friction bearings 10 and 11 are located between the ball coupling 1 and the cylinder 9, and the ball coupling 1 and the housing 5, respectively. It is understood that the socket formed by the housing means 5 may have a straight cylindrical cross-section, as shown in FIG. 6, and that the anti-friction means 10 and 11 may be eliminated. In this case, the roughness of the exterior surface of ball coupling 1 and the interior surface of the socket should be reduced as much as possible to minimize the effects of frictional forces.

Each of the flexible plates is equipped with means to determine the force exerted thereon by the flexing caused by relative movement between the two bodies. This means may comprise strain gauges affixed to each side of each of the flexible plates in accordance with known measurement techniques. FIGS. 5a and 5b show a typical example of strain gauge use wherein the strain gauges J1 and J2 are adhesively bonded to either side of the flexible plate 6. The analog signals provided by the strain gauges are evaluated by standard, known apparatus to permit a rapid and easy determination of the components of the resultant forces applied. As schematically shown in FIG. 5c, to two strain gauges J1 and J2 are connected by electrical conductors with the terminals of a measuring point such as 20 which delivers an analog signal U. The reading of such signal on a measuring instrument enables the determination of the value of the magnitude of a force such as $Ft_1$. Similar apparatus serves to determine the forces $Ft_2$, $Ft_3$, $Fz_1$, $Fz_2$ and $Fz_3$. The choice of a particular type of strain gauge is dictated by the possible requirement to store such readings in a memory and may include strain gauges of the piezo electric type.

In place of the strain gauges, other known means may be used to measure the deformation of the flexible plates. Such include optical methods (by laser or by the Poggendorff method), methods incorporating capacitive or inductive distance probes and other metrological means (such as a comparator measuring the variation from a set value).

Flexible plates 2 may be attached to hub 3 by clamping means (not shown) incorporated therein. Obviously, any other means may be utilized as long as the ends are rigidly connected to the hub. Similar means may be utilized to connect the second flexible plates 6 to connectors 7.

FIG. 4a shows the orientation of the first flexible plates 2 in accordance with the embodiment shown in FIG. 2. The flexible plates 2 are three in number and are equidistantly disposed about the first axis Oz. One of the flexible plates 2 is coincident with the axis Ox such that angle $\rho_1=0$.

A second embodiment having a different orientation of the flexible plates 2 is schematically shown in FIG. 4b. In this embodiment, angle $\rho_1=0$, but two of the flexible plates 2, those defining points $A_1$ and $A_2$ are located such that the angle between them is equal to 180°. In this embodiment, the coordinates $\rho_1$ is equal to $OA_1$ and $\rho_2=OA_2$. The point $A_3$ is located on the flexible plate which extends at an angle of 90° relative to the points $A_1$ and $A_2$, respectively.

A third embodiment of the invention is shown in FIG. 6. In this embodiment, the hub 3 is replaced by a first shaft 103 having a central axis extending along axis Oz. A plurality of first thin plates 102 are attached to one end of the shaft 103 and extend radially therefrom such that their major width dimension extends along the first axis. The second element comprises a second shaft 108 which may be coaxially aligned with the first shaft 103. As seen, the plurality of second flexible plates 106 are also rigidly attached to one end of shaft 108 and extend generally radially therefrom. However, the second flexible plates 106 are oriented generally perpendicularly with respect to the first flexible plates 102. The housing means 105 are connected by a floating ring 116 and defines socket openings which accommodate ball connections 101 and 101a. Ball connections 101 are connected to the ends of the first flexible plates, while ball connections 101a are connected to the ends of the second flexible plates 106. As in the first embodiment, the first and second flexible plates may each be three in number and may be equidistantly spaced apart around the first, central axis. As seen in FIG. 6, the anti-friction bearings 10 and 11 are not shown associated with the housing means and the ball joint connection, but it is understood that such may be incorporated therein without exceeding the scope of this invention. The ends of the first second shafts 103 and 108, respectively, may be cut away, as shown at 115, to accommodate the flexible plates.

A fourth embodiment of the invention is shown in FIG. 7. In this embodiment, a first hub element 203, similar to that set forth in the embodiment shown in FIG. 2, having a first axis is utilized to attach one end of the first flexible plates 202, which extend radially therefrom. The second element also comprises a second hub 208 which may be coaxially aligned with the first hub 203. As can be seen, the second flexible element 206 also extend radially from the second hub 208 and are oriented generally perpendicularly to the first flexible element 202. The outer ends of the second flexible plates 206 are attached to the housing means 205 which define a socket opening as previously described. Each of the first flexible plates 202 has ball connection 201 attached thereto such that it extends into the socket opening defined by housing means 205. Again, the anti-friction means 10 and 11 shown in FIG. 2 may be incorporated between the ends of first flexible plates 202 and the housing means 205. In each of the alternative embodiments, the measuring equipment and the instrumentation may be identical with that previously described.

The foregoing descriptions are provided for illustrative purposes only and should not be construed as in any way limiting this invention, the scope of which is defined solely by the appended claims.

What is claimed is:

1. A multi-axis force and moment transducer for determining the forces and moments existing between first and second bodies comprising:
   (a) a first element attached to the first body, the first element having a first axis;
   (b) a second element attached to the second body;
   (c) a plurality of housing means disposed about the first element, each of the housing means defining a socket opening with a central axis extending generally perpendicular to the first axis;
   (d) a plurality of first relatively thin flexible plates, each having a first end attached to the first element and oriented so as to flex only in a direction generally perpendicular to the first axis;
   (e) first attachment means to attach a second end of each of the first flexible plates to a housing means, the first attachment means comprising a ball attached to the second ends of the first flexible plates such that the ball fits within the socket opening in the housing means;
   (f) a plurality of second relatively thin flexible plates, each having a first end attached to the second element and oriented so as to flex only in a direction generally parallel to the first axis;
   (g) second attachment means to attach a second end of each of the second flexible plates to a housing means; and,
   (h) means associated with each plate to determine the force exerted thereon by the flexing caused by relative movement between the two bodies.

2. The multi-axis force and moment transducer according to claim 1 further comprising anti-friction bearing means interposed between the ball and the socket opening.

3. The multi-axis force and moment transducer according to claim 2 further comprising second anti-friction bearing means interposed between the ball and the second ends of the first flexible plates.

4. The multi-axis force and moment transducer according to claim 1 wherein planes containing each of the second flexible plates are parallel to each other.

5. The multi-axis force and moment transducer according to claim 1 wherein the plurality of second flexible plates are located in a common plane.

6. The multi-axis force and moment transducer according to claim 1 wherein the number of first flexible plates is equal to the number of second flexible plates.

7. The multi-axis force and moment transducer according to claim 6 wherein the first flexible plates are 3 in number, extend in a radial direction from the first element and are equidistantly spaced apart.

8. The multi-axis force and moment transducer according to claim 7 wherein the first flexible plates all have the same length.

9. The multi-axis force and moment transducer according to claim 8 wherein central longitudinal axes of the first flexible plates lie in a common plane.

10. The multi-axis force and moment transducer according to claim 9 wherein the first element comprises a hub member and the second element comprises a ring member disposed about the hub member.

11. The multi-axis force and moment transducer according to claim 10 wherein the second flexible plates extend generally parallel to the ring member.

12. The multi-axis force and moment transducer according to claim 11 wherein the second flexible plates are of substantially equal length.

13. The multi-axis force and moment transducer according to claim 9 wherein the first element comprises a first shaft member and the second element comprises a second shaft member substantially coaxially aligned with the first shaft member.

14. The multi-axis force and moment transducer according to claim 13 wherein the second flexible plates extend substantially radially from the second shaft member.

15. The multi-axis force and moment transducer according to claim 14 wherein the second flexible plates are of substantially equal length.

16. The multi-axis force and moment transducer according to claim 15 wherein the housing means are attached together by a ring member which extends about the first and second shaft members.

17. The multi-axis force and moment transducer according to claim 9 wherein the first element comprises a first hub member and the second element comprises a second hub member substantially coaxially aligned with the first hub member.

18. The multi-axis force and moment transducer according to claim 17 wherein the second flexible plates extend substantially radially from the second hub member.

19. The multi-axis force and moment transducer according to claim 18 wherein the second flexible plates are of substantially equal length.

20. The multi-axis force and moment transducer according to claim 6 wherein the first flexible plates are there in number, two of the flexible plates disposed 180° apart and a third flexible plate disposed 90° from the two flexible plates.

21. The multi-axis force and moment transducer according to claim 1 wherein the means to determine the force exerted comprises a plurality of strain gauges attached to the sides of the first and second flexible plates.

* * * * *

UNITED STATES PATENT AND TRADEMARK OFFICE
CERTIFICATE OF CORRECTION

PATENT NO. : 4,550,617
DATED : November 5, 1985
INVENTOR(S) : Fraignier et al

It is certified that error appears in the above-identified patent and that said Letters Patent is hereby corrected as shown below:

Col. 1, line 13: "displacement" should be --displacements--.
Col. 1, line 43: "connection" shouldbe --connections--.
Col. 3, line 33: "(5'): $\rho(1/2) \vec{Fz}_2 + (1/2) (\vec{Fz}_3 - \vec{Fz}_1)$"
  should be: --(5'): $\rho((1/2) \vec{Fz}_2 + (1/2) \vec{Fz}_3 - \vec{Fz}_1))$ --.

Col. 2, line 56: "the" should be --are--.
Col. 3, line 8: "and the equivalent vector couple" should be
  -- and of the equivalent vector couple --.
Col. 4, line 29: "to two" should be -- the two --.
Col. 4, line 49: "Obvously" should be -- Obviously --.
Col. 8, line 6: (claim 20, line 3) "there" should be --three--.

Signed and Sealed this

Twenty-second Day of April 1986

[SEAL]

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,550,617
DATED : November 5, 1985
INVENTOR(S) : Bernard Fraignier and Daniel E. Gery It is certified that error appears in the above-identified patent and that said Letters Patent is hereby corrected as shown below:

Please change the assignee on the first page of the patent from "S.N.E.C.M.A." to

--HISPANO-SUIZA

St. Cloud, France --.

Signed and Sealed this

Sixteenth Day of September 1986

[SEAL]

Attest:

DONALD J. QUIGG

Attesting Officer

Commissioner of Patents and Trademarks